United States Patent [19]

Janson et al.

[11] Patent Number: 5,564,997
[45] Date of Patent: *Oct. 15, 1996

[54] COMPACT MUTUAL TRANSMISSION FOR MOTOR VEHICLES

[75] Inventors: David A. Janson, Plymouth; Steven G. Thomas, Bloomfield Hills, both of Mich.

[73] Assignee: Ford Motor Company, Dearborn, Mich.

[*] Notice: The term of this patent shall not extend beyond the expiration date of Pat. No. 5,390,559.

[21] Appl. No.: 499,526

[22] Filed: Jul. 7, 1995

[51] Int. Cl.$^6$ ............................................. F16H 3/44
[52] U.S. Cl. ................................................. 475/207
[58] Field of Search .................................... 475/207

[56] References Cited

U.S. PATENT DOCUMENTS

| | | |
|---|---|---|
| 1,988,636 | 1/1935 | Thomas et al. . |
| 2,072,380 | 3/1937 | Pfeiffer et al. . |
| 2,127,353 | 8/1938 | Fishburn et al. . |
| 2,127,354 | 8/1938 | Fishburn et al. . |
| 2,128,028 | 11/1938 | Dooley . |
| 2,242,276 | 5/1941 | Vincent . |
| 2,254,334 | 9/1941 | Vincent . |
| 2,514,158 | 7/1950 | Hussain . |
| 2,576,478 | 11/1951 | Beckwith . |
| 2,592,210 | 4/1952 | Swennes . |
| 2,768,534 | 10/1956 | Orr . |
| 2,787,919 | 4/1957 | Senkowski et al. . |
| 3,396,610 | 8/1968 | Rich, Jr. et al. . |
| 3,429,202 | 2/1969 | Galicher . |
| 3,468,192 | 9/1969 | Nasvytis . |
| 3,554,054 | 1/1971 | Nasvytis . |
| 3,572,167 | 3/1971 | Bosko et al. . |
| 3,589,483 | 6/1971 | Smith . |
| 3,654,822 | 4/1972 | Singer et al. . |
| 3,837,237 | 9/1974 | Rossler et al. . |
| 4,094,206 | 6/1978 | Sogo et al. . |
| 4,282,775 | 8/1981 | Van Dest . |
| 4,368,650 | 1/1983 | Numazawa et al. . |
| 4,403,526 | 9/1983 | Numazawa et al. . |
| 4,416,168 | 11/1983 | Arai et al. . |
| 4,611,504 | 9/1986 | Rundle . |
| 4,823,628 | 4/1989 | Hiraiwa . |
| 5,390,559 | 2/1995 | Thomas et al. . |
| 5,458,014 | 10/1995 | Thomas et al. ............... 161/623 |

FOREIGN PATENT DOCUMENTS

| | | |
|---|---|---|
| 0541023A1 | 5/1993 | European Pat. Off. . |
| 2518200 | 6/1983 | France . |
| 1580056 | 7/1970 | Germany . |
| 2708524 | 8/1978 | Germany . |
| 3415479A1 | 10/1985 | Germany . |
| 3432193A1 | 3/1986 | Germany . |
| 4000833A1 | 7/1991 | Germany . |
| 4109832A1 | 10/1992 | Germany . |

*Primary Examiner*—Dirk Wright
*Attorney, Agent, or Firm*—James J. Dottavio

[57] ABSTRACT

A multiple-speed ratio transmission mechanism for an automotive vehicle includes a torque input shaft, an output shaft and intermediate shaft rotatably supported. Multiple pinion gear pairs are supported on the shafts. Two adjacent pinion-gear pairs are associated with two speed ratios. A planetary gear unit, including a sun gear, ring gear, and a set of planet pinions rotatably supported on a carrier, has its input connected to the intermediate shaft and its output connected to the output shaft. Each forward pinion-gear pairs is releasably coupled to one of the intermediate shaft and the output shaft.

15 Claims, 2 Drawing Sheets

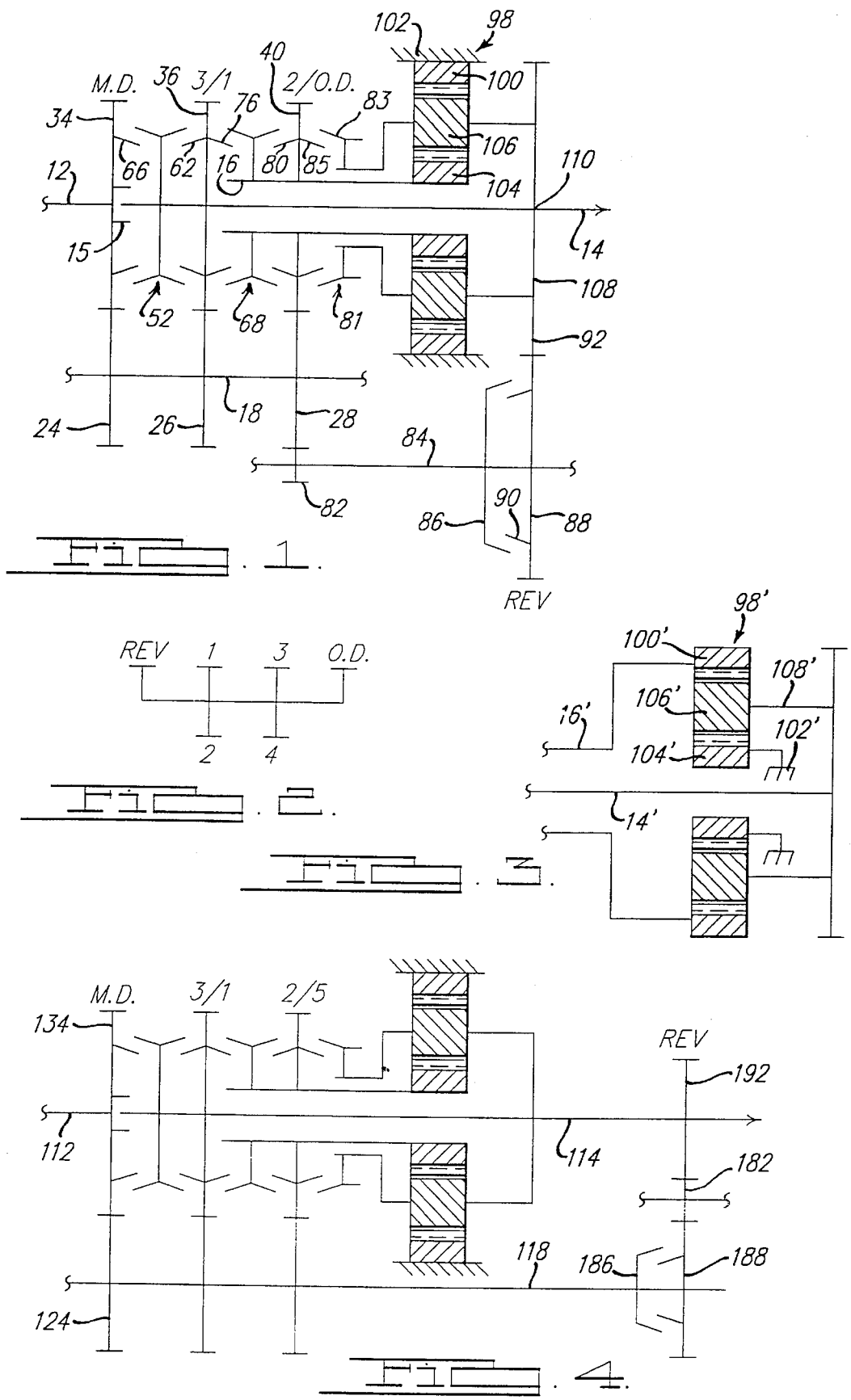

COMPACT MUTUAL TRANSMISSION FOR MOTOR VEHICLES

BACKGROUND OF THE INVENTION

1. Field of the Invention

This invention pertains to the arrangement of gears, shafts, and synchronizers of an automotive transmission, especially to such a transmission of the type having both planetary gear unit and mating pinions and gears to produce a plurality of gear ratios.

2. Description of the Prior Art

When the engine of a motor vehicle is idling and the neutral clutch that connects the engine to a manual transmission is disengaged, the speed of the engine varies as a result of cyclic irregularity intrinsic in the operation of an internal combustion engine. Countershaft manual transmissions for automotive use contain gear sets whose members are in continuous meshing engagement, though the gear selector of the transmission is in the neutral position. When the maindrive clutch is engaged and the gear selector is in the neutral position, speed changes of the engine transmitted to the gearset produce noise called "neutral rollover gear rattle." When the engaged gear teeth change position with respect to each other due to engine speed variations, the teeth of the driven gear contact alternately the driving face and the nondriving face of the driving pinion. "In-gear rattle" occurs when the transmission is in gear (usually low speed gears) and clutched to an engine running above its idle setting, i.e., when engine speed and torque are relatively low but sufficient to drive a load or vehicle.

To reduce or eliminate this objectionable noise, various devices have been employed to take up clearances between the faces of the gear and mating pinion. These devices include a wheel coaxially arranged with the gear having similar teeth to those of the gear, and means for elastically maintaining the teeth of the gear in position that is angularly offset relative to the gear. A mechanical spring, usually a helical spring, located radially offset from the axis of the gear, applies a force directed tangentially to the axis tending to rotate the angular element with respect to the gear wheel. Other means such as elastomeric material have been used in the prior art to bias an angular member angularly with respect to a gear to maintain contact between the gear teeth in order to avoid gear rattle.

U.S. Pat. No. 4,718,295 describes use of a one-way clutch located on the input shaft between a gear wheel and a cylindrical surface of the shaft. The one-way clutch permits a one-way drive connection so that power can be transmitted through the clutch from the input shaft to either of two countershafts when fourth and fifth gear ratios are selected by the vehicle operator.

It is an object in the design of a manual transmission to minimize the effort required to make gear ratio changes, i.e., to reduce as much as possible the magnitude of force that must be applied to a shift mechanism to disengage a current gear ratio and to engage a new gear ratio. The magnitude of that force is to a great extent determined by the magnitude of inertia of rotating components that is reflected to the synchronizer units. Minimizing the weight of components of a motor vehicle is desired in order to reduce fuel consumption. Various attempts have been made to reduce noise produced by a manual transmission and to reduce rotating inertia of the gears, shafts, synchronizers and other such components.

SUMMARY OF THE INVENTION

It is an object of the present invention to provide a multiple-speed, motor vehicle manual transmission having minimum size, weight, and rotating inertia consistent with the requisite torque capacity. Use of a planetary gear unit to produce speed reduction in the lower speed ratios permits the diameters of mating pinions and gears to be smaller than otherwise they would be and helps to reduce the distance between the input shaft and intermediate and output shafts. The result is a compact transmission having a high power density, low rotating inertia and low weight.

In realizing these advantages the transmission according to the present invention includes an input shaft adapted for driveable connection to a power source, such as an internal combustion engine or motor, an output shaft and intermediate shaft arranged mutually coaxial and parallel to, the input shaft, the output shaft being adapted for connection to a load; or the arrangement may comprise an output shaft and intermediate shaft and input shaft arranged mutually coaxial, the output shaft being adapted for connection to a load, and a countershaft substantially parallel to the other shafts.

Multiple pairs of gears and pinions have one member of each pair supported on the input shaft and another member of each pair supported on either the output shaft or intermediate shaft. In the alternative, one member is supported by the countershaft and another member is supported on either the input shaft, the output shaft, or the intermediate shaft. These pairs of gears and pinions produce various speed reductions corresponding to the gear ratio selected by the vehicle operator. The gear of each gear-pinion pair that operates to produce the higher speed ratios is connected to the output shaft; the gear of each gear-pinion pair that operates to produce the lower forward speed ratios are connected to the intermediate shaft.

A planetary gear unit is also employed to produce a speed reduction in certain selected gear ratios. The planetary gear unit includes a sun gear connected to the intermediate shaft, a ting gear fixed against rotation on the casing, a pinion carrier driveably connected to the output shaft, and a set of planet pinions in continual meshing engagement with the sun gear and ring gear, the pinion set being supported on the pinion carrier. The planetary gear unit can also be arranged such that the sun gear is fixed against rotation on the casing, the ting gear is connected to the intermediate shaft, the pinion carrier is driveably connected to the output shaft, and the set of planet pinions is in continual meshing engagement with the sun gear and ring gear, the pinion set being supported rotatably on the pinion carrier.

Synchronizers releasably connect and disconnect a member of each pinion-gear pair to the pinion carrier or the shaft on which the synchronizer is supported, producing two gear ratios with each forward gear.

BRIEF DESCRIPTION OF THE DRAWINGS

FIG. 1 is a schematic diagram of a transmission according to this invention.

FIG. 2 is a diagram representing the location of forward drive and reverse drive positions, among which the gearshift lever is moved to select the desired gear ratios.

FIG. 3 shows an alternate arrangement of the planetary gear unit in which the ring gear is driven and the sun gear is held.

FIG. 4 is an alternate schematic diagram of a transmission according to this invention.

DESCRIPTION OF THE PREFERRED EMBODIMENT

Figure 5:
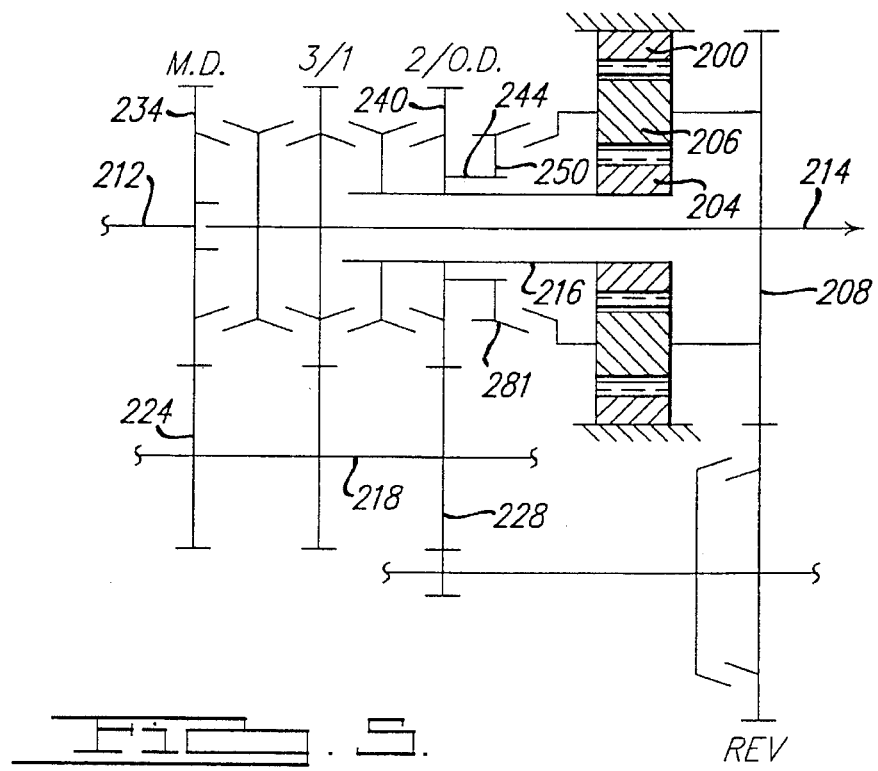
FIG. 5 is another alternate schematic diagram of a transmission according to this invention.

Referring first to FIG. 1, the transmission, which is housed in mating casings, includes an input shaft 12 adapted for driveable connection to a power source such as an internal combustion engine. Located adjacent the input shaft is an output shaft 14 supported rotatably partially on a pocket bearing 15 located in a recess formed on the end of the input shaft. A sleeve shaft 16, aligned coaxially with the output shaft and input shaft, extends along a portion of the length of the output shaft.

A countershaft 18, supported at the transmission casing (not shown), is disposed parallel to shafts 12, 14, and 16. The countershaft carries a gear 24 which is driven by the main drive pinion 34 carried by the input shaft 12. The countershaft also carries pinions 26, and 28, which are members of gear-pinion pairs associated with the third, first, second, fifth (overdrive) forward speed ratios and reverse speed ratio. Pinion 28 is splined to countershaft 18. Output shaft 14 supports gear 36, which is in continuous engagement with pinion 26. As illustrated in FIG. 1, pinion 26 is mounted adjacent pinion 28, axially spaced on countershaft 18.

Shaft 16 supports a second speed ratio gear 40, which continuously meshes with pinion 28. In the alternate embodiment shown in FIG. 5, second speed gear 240 includes a portion 244 that extends along the longitudinal axis on the outer surface of shaft 216 and supports a synchronizer 281 having hub 248, which is splined at 250 to gear 240. Referring back to FIG. 1, gear 36 is journalled on the outer surface of output shaft 14; gear 40 is journalled on the outer surface of shaft 16.

A 3-4 synchronizer 52 is splined to the outer surface of shaft 14. Synchronizer 52 operates rightward and leftward from the neutral position to positions of engagement with a conical ring 66 fixed to pinion 34, and a conical ring 62 fixed to gear 36. When the 3-4 synchronizer 52 moves leftward, it connects input shaft 12 to output shaft 14. When the 3-4 synchronizer 52 moves rightward, it driveably connects gear 36 to output shaft 14.

A 1-2 synchronizer 68 is splined to shaft 16. The 1-2 synchronizer 68 moves leftward into engagement with a conical ring 76 fixed to gear 38, thereby driveably connecting gear 38 to shaft 16. The 1-2 synchronizer 68 moves rightward into engagement with a conical ring 80 fixed to gear 40, thereby driveably connecting gear 40 to shaft 16.

A fifth forward gear ratio is provided by engaging the second gear 40 with a synchronizer 81 which is splined to the pinion carrier 108. Synchronizer 81 includes a sleeve 83 that engages the second gear 40 at a conical ring 85 fixed to second gear 40 when synchronizer 81 is moved leftward. Engagement of synchronizer 81 and gear 40 creates a driving connection to the pinion carrier 108, resulting in an overdrive gear ratio through the planetary gearset 98. Synchronizer 81 may be splined to pinion carrier 108 as shown in FIG. 1; or as shown in FIG. 5, synchronizer 281 may be splined to second speed gear 240 at a portion 244 that extends along the longitudinal axis on the outer surface of shaft 216.

Planetary gear unit 98 includes ting gear 100, permanently held against rotation on casing portion 102; sun gear 104, permanently splined to shaft 16; planet pinions 106 in continuously meshing engagement with the ring gear and sun gear; and pinion carrier 108, which rotatably supports the set of planet pinions 106 and is splined at 110 to output shaft 14. In the arrangement of FIG. 1, the sun gear is the torque input, the torque reaction is located at the ring gear 100, and the output is taken at the pinion carrier 108 and output shaft 14.

FIG. 3 shows an alternate arrangement of the planetary gear unit 98' in which shaft 16' is driveably connected to ring gear 100' so that the ring gear and shaft 16' turn as a unit. Sun gear 104' is held against rotation on transmission casing 102'. Carrier 108' is driveably connected to output shaft 14' and rotatably supports a set of planet pinions 106', which are in continuous meshing engagement with the ring gear 100' and sun gear 104'. In this arrangement, the ring gear 100' is driven, the torque reaction is provided at the sun gear 104', and the output is taken on the carrier 108' and output shaft 14'.

Reverse drive is produced by pinion 28 continually driving gear 82, which is attached to idler shaft 84, disposed substantially parallel to the countershaft 18. Reverse synchronizer 86 is splined to idler shaft 84, and engages reverse pinion 88 at conical ring 90 when moved rightwardly. Reverse pinion 88 drives a reverse gear 92 attached to the pinion carrier 108 or output shaft 14.

An alternate reverse drive is produced by providing a reverse pinion and synchronizer (not shown) on countershaft 18 and providing an idler gear between the reverse gear on the countershaft and the reverse gear 92. Although not shown in FIG. 1, this drive is similar to that shown in FIG. 4, where a reverse pinion and gear 188 are provided on the counter shaft 124 to drive idler gear 182 and reverse gear 192. A reverse drive of this type is described in U.S. Pat. No. 5,390,559. Alternatively, a reverse drive wheel (not shown) could be supported rotatably on an axially extending portion of countershaft 18 and a sprocket wheel (not shown) provided on the pinion carrier 108 or output shaft 14 driven by a chainbelt (not shown) to produce a reverse drive mechanism. A reverse drive of this type is described in U.S. Pat. No. 4,337,093.

The transmission gears are shifted by using a shift lever and shift rail system supported by the casing, similar to that described in U.S. Pat. No. 5,390,559, the entire disclosure of which is incorporated herein by reference.

In operation, the lowest gear ratio, is produced by the transmission when synchronizer 68 is moved leftward, thereby driveably connecting low gear 36 to shaft 16. The torque delivery path includes input shaft 12, pinion 34, gear 24, countershaft 18, pinion 26, gear 36, synchronizer 68, shaft 16, planetary gear unit 98, carrier 108, and output shaft 14. The planetary gear unit produces a speed reduction between shaft 16 and output shaft 14 in addition to the speed reduction produced by pinion-gear 34, 24 and pinion gear 26, 36 between input shaft 12 and shaft 16.

The second forward gear ratio is produced by moving synchronizer 68 rightward into engagement with conical ring 80 fixed to second gear 40. The torque delivery path between the input shaft and output shaft, which produces a slight speed increase through the main drive gearset that includes pinion 34 and gear 24, includes also countershaft 18, pinion 28, gear 40, synchronizer 68, shaft 16, planetary gear unit 98, and carrier 108, which drives output shaft 14.

The third forward speed ratio is produced when synchronizer sleeve 52 is moved rightward to connect the second speed gear 36 and output shaft 14 while maintaining the other synchronizers in their neutral positions. The torque delivery path includes the main drive pinion 34 and gear 24, countershaft 18, third ratio pinion 26, third ratio gear 36, and synchronizer 52, which drives the output shaft 14.

The transmission produces the fourth speed ratio, a direct drive connection between the input shaft and output shaft when synchronizer 52 is moved leftward. This action produces a drive connection between the conical ting 66, which is formed integrally with input shaft 12, and output shaft 14, through synchronizer 52.

The fifth forward speed ratio, an overdrive ratio, is produced by moving synchronizer 81 leftward into engagement with the conical ting 85 on the second ratio gear 40, thereby driveably connecting gear 40 and the output shaft 14 through synchronizer 81 and carrier 108. The torque delivery path includes input shaft 12, main drive pinion 34, gear 24, countershaft 18, second ratio pinion 28, second ratio gear 40, synchronizer 81, carrier 108, and output shaft 14.

The reverse drive ratio is produced by moving synchronizer sleeve 86 rightward into engagement with cone ting 90 formed integrally with reverse output pinion 88. The torque delivery path for reverse drive includes input shaft 12, main drive pinion 34, gear 24, countershaft 18, second ratio pinion 28, idler gear 82, idler shaft 84, synchronizer 86, reverse pinion 88, reverse gear 92, pinion carrier 108, and output shaft 14. In order to provide adequate reverse gear reduction, a gear cluster (not shown) may be interposed between the reverse pinion 88 and reverse gear 92.

As shown in FIG. 4, an alternative reverse gear arrangement includes a reverse pinion 188 on countershaft 118, a reverse gear 192 on the output shaft 114, and a reverse idler gear 182 therebetween. Synchronizer 186 couples and decouples the reverse pinion 188 to the countershaft 118 to selectively provide driveable engagement with the output shaft 114. In this arrangement, the torque delivery path for reverse drive includes input shaft 112, main drive pinion 134, gear 124, countershaft 118, synchronizer 186, reverse pinion 188, reverse idler 182, reverse gear 192, and output shaft 114. Alternatively, the reverse pinion-gear gearset 188, 182, 192 could be replaced with a pair of sprocket wheels attached to the countershaft and output shaft, respectively, driveably connected with a chainbelt (not shown). A reverse drive of this type is described in U.S. Pat. No. 4,337,093.

As shown in FIG. 5, the 5th gear synchronizer 281 is supported by a portion 244 of second gear 240 that extends along the longitudinal axis on the outer surface of shaft 216. The torque delivery path is similar to that of FIG. 1, including input shaft 212, main drive pinion 234, gear 224, countershaft 218, second ratio pinion 228, second ratio gear 240, synchronizer 281, carrier 208, and output shaft 214.

Figure 6:
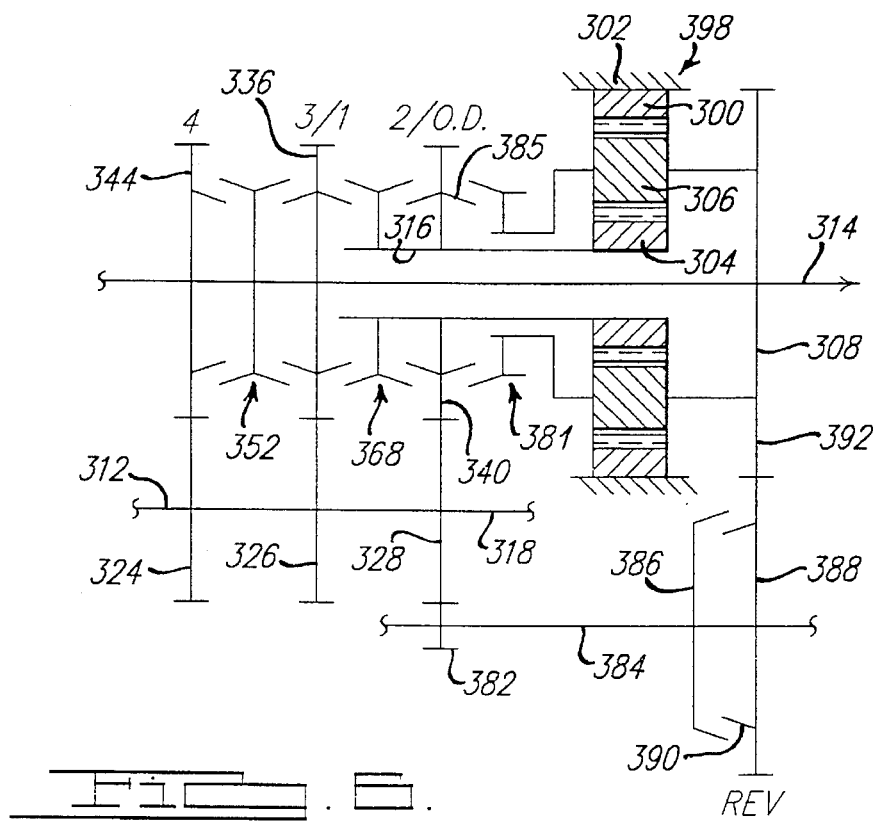
FIG. 6 is another alternate schematic diagram of a transmission according to this invention.

FIG. 6 shows an alternate embodiment to the transmission shown in FIG. 1, but the input shaft 312 is arranged parallel to the output shaft 314 and sleeve shaft 316. The torque delivery paths for gear ratios in the embodiment shown in FIG. 6 are as follows. The lowest gear ratio is produced by the transmission when synchronizer 368 is moved leftward, thereby driveably connecting low gear 336 to shaft 316. The torque delivery path includes input shaft 312, pinion 326, gear 336, shaft 316, planetary gear unit 398, carrier 308, and output shaft 314.

The second forward gear ratio is produced by moving synchronizer 368 rightward into engagement with conical ring 380 fixed to second gear 340. The torque delivery path includes input shaft 312, pinion 328, gear 340, synchronizer 368, shaft 316, planetary gearset 398 and pinion carrier 308, which is connected to the output shaft 314.

The third forward speed ratio is produced when synchronizer sleeve 352 is moved rightward to connect the second speed gear 336 and output shaft 314 while maintaining the other synchronizers in their neutral positions. The torque delivery path includes the input shaft 312, third ratio pinion 326, third ratio gear 336, and synchronizer 352, which drives the output shaft 314.

The fourth speed ratio is produced when synchronizer 352 is moved leftward. The torque delivery path includes the input shaft 312, fourth ratio pinion 324, fourth ratio gear 334, and synchronizer 352, which drives the output shaft 314.

The fifth forward speed ratio is produced by moving synchronizer 381 leftward into engagement with the conical ring 385 on the second ratio gear 340, driveably connecting gear 340 and the output shaft 314 through synchronizer 381 and carrier 308. The torque delivery path includes input shaft 312, second ratio pinion 328, second ratio gear 340, synchronizer 381, carrier 308, and output shaft 314.

Reverse drive ratio is produced by moving synchronizer sleeve 386 rightward into engagement with cone ring 390 formed integrally with reverse output pinion 388. The torque delivery path for reverse drive includes input shaft 312, second ratio pinion 328, idler gear 382, idler shaft 384, synchronizer 386, reverse pinion 388, reverse gear 392, pinion carrier 308, and output shaft 314.

Although the preferred embodiment of the present invention has been disclosed, various changes and modifications may be made without departing from the scope of the invention as set forth in the appended claims.

What I claim is:

1. A transmission for producing multiple speed ratios, comprising:

an input shaft;

an output shaft substantially coaxial with the input shaft;

an intermediate shaft substantially coaxial with the input shaft;

a countershaft substantially parallel to the input shaft;

main drive means for driveably connecting the countershaft and input shaft;

multiple pairs of forward drive pinions and gears, the members of each pair being in continual mutual meshing engagement, a first member of each pair supported on the countershaft, a second member of each pair supported on one of the output shaft and intermediate shaft, two adjacent pairs associated with two speed ratios;

a planetary gear unit including a sun gear, a ring gear, a carrier driveably connected to the output shaft, and planet pinions supported on the pinion carrier in continual meshing engagement with the sun gear and ring gear, one component of the group consisting of the ring gear and sun gear being driveably connected to the intermediate shaft, the other component of said group being fixed against rotation, the carrier connected to the output shaft; and means for releasably connecting a member of each forward drive pinion-gear pair, respectively, to one of the output shaft and intermediate shaft, including:

first synchronizer means, carried on the output shaft, for mutually connecting and releasing the input shaft and a member of a first pinion-gear pair, alternately, and the output shaft;

second synchronizer means, carried on the intermediate shaft, for mutually connecting and releasing a member of the first and a second pinion-gear pairs, alternately, and the intermediate shaft; and third synchronizer means, carried on one of the second gear and pinion carrier, for mutually connecting and releasing a member of the second pinion-gear pair and the pinion carrier.

2. The transmission of claim 1 wherein the planetary gear unit includes:

a sun gear connected to the intermediate shaft;

a ring gear fixed against rotation;

a carrier driveably connected to the output shaft; and planet pinions supported on the pinion carrier, in continual meshing engagement with the sun gear and ring gear.

3. The transmission of claim 1 wherein the planetary gear unit includes:

a ring gear connected to the intermediate shaft;

a sun gear fixed against rotation;

a carrier driveably connected to the output shaft; and planet pinions supported on the pinion carrier, in continual meshing engagement with the sun gear and ring gear.

4. A transmission for producing multiple speed ratios, comprising:

an input shaft;

an output shaft substantially coaxial with the input shaft;

an intermediate shaft substantially coaxial with the input shaft;

a countershaft substantially parallel to the input shaft;

main drive means for driveably connecting the countershaft and input shaft;

multiple pairs of forward drive pinions and gears, the members of each pair being in continual mutual meshing engagement, a first member of each pair supported on the countershaft, a second member of each pair supported on one of the output shaft and intermediate shaft, two adjacent pairs associated with two speed ratios;

a planetary gear unit including a sun gear, a ring gear, a carrier driveably connected to the output shaft, and planet pinions supported on the pinion carrier in continual meshing engagement with the sun gear and ring gear, one component of the group consisting of the ring gear and sun gear being driveably connected to the intermediate shaft, the other component of said group being fixed against rotation, the carrier connected to the output shaft;

reverse drive means; and means for releasably connecting a member of each forward-drive pinion-gear pair, respectively, to one of the output shaft and intermediate shaft, including:

first synchronizer means, carried on the output shaft, for mutually connecting and releasing the input shaft and a member of a first pinion-gear pair, alternately, and the output shaft;

second synchronizer means, carried on the intermediate shaft, for mutually connecting and releasing a member of the first and a second pinion-gear pairs, alternately, and the intermediate; and third synchronizer means, carried on one of the second gear and pinion carrier, for mutually connecting and releasing a member of the second pinion-gear pair and the pinion carrier.

5. The transmission of claim 4, wherein said reverse drive means comprises:

an idler shaft, substantially parallel to said countershaft;

an idler gear rotatably supported by said idler shaft, in meshing engagement with one of the group supported by the countershaft consisting of said members of said pinion-gear pairs and main drive means;

a reverse pinion, rotatably supported by said idler shaft;

a reverse gear, supported by said output shaft, said reverse gear in continual meshing engagement with said reverse pinion;

a means, carried on said idler shaft, for releasably connecting one of the group consisting of said idler gear and said reverse pinion with said idler shaft.

6. The transmission of claim 4 wherein said reverse drive means comprises:

a reverse pinion, rotatably supported by said input shaft;

an idler shaft, substantially parallel to said input shaft;

an idler gear rotatably supported by said idler shaft, in meshing engagement with said reverse pinion;

a reverse gear, supported by said output shaft, said reverse gear in continual meshing engagement with said idler gear;

a means, carried on said input shaft, for releasably connecting said reverse pinion and said input shaft.

7. A multiple speed transmission for producing multiple speed ratios, comprising:

an input shaft;

an output shaft substantially parallel to the input shaft;

an intermediate shaft substantially coaxial with the output shaft;

multiple pairs of gears and pinions, the members of each pair in continual mutual meshing engagement, each pair associated with a speed ratio, a first member of each pair supported on the input shaft, a second member of each pair connectable one of the group consisting of said intermediate shaft and said output shaft, two adjacent pairs being associated with two speed ratios;

a planetary gear unit including a sun gear, a ring gear, a pinion carrier driveably connected to the output shaft, and planet pinions supported on the pinion carrier in continual meshing engagement with the sun gear and ring gear, one component of the group consisting of the ring gear and sun gear being driveably connected to the intermediate shaft, the other component of said group being fixed against rotation; and means for releasably connecting a member of each pinion-gear pair, respectively, to one of the group consisting of the output shaft and intermediate shaft.

8. The transmission of claim 7 wherein the planetary gear unit includes:

a sun gear connected to the intermediate shaft;

a ring gear fixed against rotation;

a carrier driveably connected to the output shaft; and planet pinions supported on the pinion carrier, in continual meshing engagement with the sun gear and ring gear.

9. The transmission of claim 7 wherein the planetary gear unit includes:

a ring gear connected to the intermediate shaft;

a sun gear fixed against rotation;

a carrier driveably connected to the output shaft; and planet pinions supported on the pinion carrier, in continual meshing engagement with the sun gear and ring gear.

10. The transmission of claim 7 wherein the connecting means comprises:

first synchronizer means, carried on the output shaft, for mutually connecting and releasing a member of a first and second pinion-gear pairs, respectively, and the output shaft;

second synchronizer means, carried on the intermediate shaft, for mutually connecting and releasing alternately a member of the second and a third pinion-gear pairs, respectively, and the intermediate shaft;

third synchronizer means, carried on one of the second gear and pinion carrier, for mutually connecting and releasing a member of the second pinion-gear pair and the pinion carrier.

11. The transmission of claim 10 wherein the planetary gear unit includes:

a sun gear connected to the intermediate shaft;

a ring gear fixed against rotation;

a carrier driveably connected to the output shaft; and planet pinions supported on the pinion carrier, in continual meshing engagement with the sun gear and ring gear.

12. The transmission of claim 10 wherein the planetary gear unit includes:

a ring gear connected to the intermediate shaft;

a sun gear fixed against rotation;

a carrier driveably connected to the output shaft; and planet pinions supported on the pinion carrier, in continual meshing engagement with the sun gear and ring gear.

13. A transmission for producing multiple speed ratios, comprising:

an input shaft;

an output shaft substantially coaxial with the input shaft;

an intermediate shaft substantially coaxial with the input shaft;

a countershaft substantially parallel to the input shaft;

main drive means for driveably connecting the countershaft and input shaft;

multiple pairs of forward drive pinions and gears, the members of each pair being in continual mutual meshing engagement, a first member of each pair supported on the countershaft, a second member of each pair supported on one of the output shaft and intermediate shaft, two adjacent pairs associated with two speed ratios;

a planetary gear unit including a sun gear, a ring gear, a carrier driveably connected to the output shaft, and planet pinions supported on the pinion carrier in continual meshing engagement with the sun gear and ring gear, one component of the group consisting of the ring gear and sun gear being driveably connected to the intermediate shaft, the other component of said group being fixed against rotation, the carrier connected to the output shaft;

reverse drive means; and means for releasably connecting a member of each forward drive pinion-gear pair, respectively, to one of the output shaft and intermediate shaft, including:

first synchronizer means, carried on the output shaft, for mutually connecting and releasing the input shaft and a member of a first pinion-gear pair, alternately, and the output shaft;

second synchronizer means, carried on the intermediate shaft, for mutually connecting and releasing a member of the first and a second pinion-gear pairs, alternately, and the intermediate; and third synchronizer means, carried on one of the second gear and pinion carrier, for mutually connecting and releasing a member of the second pinion-gear pair and the pinion carrier.

14. The transmission of claim 13, wherein said reverse drive means comprises:

an idler shaft, substantially parallel to said countershaft;

an idler gear rotatably supported by said idler shaft, in meshing engagement with one of the group supported by the countershaft consisting of said members of said pinion-gear pairs and main drive means;

a reverse pinion, rotatably supported by said idler shaft;

a reverse gear, supported by said output shaft, said reverse gear in continual meshing engagement with said reverse pinion;

a means, carried on said idler shaft, for releasably connecting one of is the group consisting of said idler gear and said reverse pinion with said idler shaft.

15. The transmission of claim 13 wherein said reverse drive means comprises:

a reverse pinion, rotatably supported by said input shaft;

an idler shaft, substantially parallel to said input shaft;

an idler gear rotatably supported by said idler shaft, in meshing engagement with said reverse pinion;

a reverse gear, supported by said output shaft, said reverse gear in continual meshing engagement with said idler gear;

a means, carried on said input shaft, for releasably connecting said reverse pinion and said input shaft.

\* \* \* \* \*